United States Patent
Ho et al.

(10) Patent No.: US 9,621,907 B2
(45) Date of Patent: Apr. 11, 2017

(54) SYSTEM AND METHOD FOR TRANSCODING DATA

(71) Applicant: Silicon Image, Inc., Sunnyvale, CA (US)

(72) Inventors: Keangpo Ricky Ho, San Jose, CA (US); Shi Cheng, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 256 days.

(21) Appl. No.: 14/460,737

(22) Filed: Aug. 15, 2014

(65) Prior Publication Data
US 2016/0050425 A1   Feb. 18, 2016

(51) Int. Cl.
*H04N 19/40* (2014.01)
*H04N 19/115* (2014.01)

(52) U.S. Cl.
CPC ......... *H04N 19/40* (2014.11); *H04N 19/115* (2014.11)

(58) Field of Classification Search
None
See application file for complete search history.

(56) References Cited

U.S. PATENT DOCUMENTS

| | | | |
|---|---|---|---|
| 7,487,426 B2 | 2/2009 | Hoyer | |
| 7,639,687 B1 | 12/2009 | Tsai et al. | |
| 7,978,099 B2 | 7/2011 | Lee et al. | |
| 2009/0190595 A1 | 7/2009 | Jiang et al. | |
| 2012/0307842 A1* | 12/2012 | Petrov | H04N 21/23608 370/474 |
| 2013/0235886 A1 | 9/2013 | Wang | |
| 2014/0136921 A1* | 5/2014 | Murakami | H03M 13/1154 714/758 |
| 2014/0161174 A1 | 6/2014 | Mohsenian | |

OTHER PUBLICATIONS

PCT International Search Report and Written Opinion, PCT Application No. PCT/US2015/044343, Dec. 3, 2015, 10 pages.
Walker, R.C. et al., "64b/66b Low-Overhead Coding Proposal for Serial Links," IEEE 802.3 High Speed Study Group, Jan. 12, 2000, 17 pages.

* cited by examiner

*Primary Examiner* — Kate Luo
(74) *Attorney, Agent, or Firm* — Fenwick & West LLP

(57) ABSTRACT

A method for transcoding data comprises receiving an input stream of data formatted according to a USB standard, the input stream is partitioned into a sequence of blocks having a fixed length. At least one input block of the input stream comprises one or more data symbols and one or more control symbols, the one or more control symbols include one or more general control symbols. The method also includes transcoding the at least one input block to generate at least one output block comprising a synchronization block and a control/data block. The control/data block comprises the one or more data symbols of the at least one input block, a representation of the one or more general control symbols of the at least one input block, and a plurality of indicators indicating locations of the one or more data symbols and control symbols in the at least one input block.

15 Claims, 10 Drawing Sheets

FIG. 2

| | Input Block 310 | | | | | Sync | Output Block 340 | | | | |
|---|---|---|---|---|---|---|---|---|---|---|---|
| | | | | | | | | Control/Data Block 330 | | | |
| | | | | | | | Octet0 | Octet1 | Octet2 | Octet3 | Octet4 |
| R1 → | D0 | D1 | D2 | D3 | D4 | 0  1 | D0 | D1 | D2 | D3 | D4 |
| R2 → | EPF | D0 | D1 | D2 | D3 | 1  0 | 10000011 | D0 | D1 | D2 | D3 |
| R3 → | C0 | EPF | D0 | D1 | D2 | 1  0 | 10000101 | C0 | D0 | D1 | D2 |
| R4 → | C0 | C1 | EPF | D0 | D1 | 1  0 | 10000111 | C0 | C1 | D0 | D1 |
| R5 → | C0 | C1 | C2 | EPF | D0 | 1  0 | 10001001 | D0 | C1 | C2 | D0 |
| R6 → | D0 | D1 | D2 | D3 | C0 | 1  0 | 0_C0'_1 | D0 | D1 | D2 | D3 |
| R7 → | D0 | D1 | D2 | C0 | C1 | 1  0 | 0_C0'_0 | 0_C1'_1 | D0 | D1 | D2 |
| R8 → | D0 | D1 | C0 | C1 | C2 | 1  0 | 0_C0'_0 | 0_C1'_0 | 0_C2'_1 | D0 | D1 |
| R9 → | D0 | C0 | C1 | C2 | C3 | 1  0 | 0_C0'_0 | 0_C1'_0 | 0_C2'_0 | 0_C3'_1 | D0 |
| R10 → | C0 | C1 | C2 | C3 | C4 | 1  0 | 0_C0'_0 | 0_C1'_0 | 0_C2'_0 | 0_C3'_0 | 0_C4'_0 |

FIG. 3

SYSTEM AND METHOD FOR TRANSCODING DATA

BACKGROUND

Field of the Disclosure

This disclosure pertains to a system and method for transcoding data.

Description of the Related Art

One popular transcoding method used for universal synchronous bus (USB) data, for example, is 8b/10b transcoding. In an 8b/10b transcoding, each 8-bits of input stream of data is transcoded into 10-bits of output stream of data. While 8b/10b is a popular method of transcoding USB data, it has a drawback of adding significant transcoding overhead. For example, to transmit USB data at a typical data rate of 4 Gb/s, USB data transcoded with 8b/10b scheme needs to be transmitted at a data rate of 5 Gb/s due to the additional 2-bits for every 8-bits of input data. This translates to 25% coding overhead with the 8b/10b transcoding scheme.

With the increase of the image resolution of video data, the data rates of data transfer between devices is also increasing. For example, the migration from full high-definition (FHD, or 1080p resolution) with 1080 lines to ultra-high-definition (UHD, or popularly referred to as 4K) with 2160 lines quadruples the data rate. The data rate for the USB3 standard is 4 Gb/s. If an 8b/10b transcoding scheme is used on USB3 data, the USB3 data need to be transmitted at a data rate of 5 Gb/s to effectively transmit at 4 Gb/s due to the 25% coding overhead. Because of increasing data rates and limited bandwidth, it is useful to come up with transcoding schemes that reduce the coding overhead and improve the transmission efficiency.

SUMMARY

Embodiments of the present disclosure relate to a method for transcoding data. The method includes receiving an input stream of data formatted according to a universal synchronous bus (USB) standard, where the input stream is partitioned into a sequence of blocks having a fixed length. At least one input block of the input stream includes one or more data symbols and one or more control symbols, where the one or more control symbols include one or more general control symbols. The method also includes transcoding the at least one input block to generate at least one output block including a synchronization block and a control/data block. The control/data block includes the one or more data symbols of the at least one input block, a representation of the one or more general control symbols of the at least one input block, and a plurality of indicators indicating locations of the one or more data symbols and control symbols in the at least one input block. Embodiments also include an apparatus to transcode data and a non-transitory computer-readable medium that includes a program, the program being executable by a processor for performing the method for transcoding data.

In one embodiment, the received input stream includes groups of at least four consecutive data symbols and groups of at least four consecutive control symbols, wherein each of the groups of at least four consecutive control symbols includes at least three general control symbols and ends with a delimiter control symbol, wherein the sequence of blocks includes at least one block having a group of at least four consecutive data symbols beginning at each available symbol position.

In one embodiment, the transcoding method further includes determining a first indicator including one or more bits indicating whether the at least one input block ends with a control symbol or a data symbol and determining a second indicator indicating whether remaining symbols positioned after the second indicator in the at least one output block include at least one control symbol.

In one embodiment, responsive to the at least one input block including a delimiter control symbol, the method further includes determining a third indicator including one or more bits indicating a location of the delimiter control symbol in the at least one input block, the one or more bits of the third indicator distinct from the one or more bits of the first and second indicators, wherein the at least one output block further includes the third indicator.

In one embodiment, responsive to the at least one input block ending with a data symbol, the method further includes determining a fourth indicator including one or more bits indicating a location of the one or more data symbols before a control symbol in the at least one input block, the one or more bits of the fourth indicator distinct from the one or more bits of the first, second, and third indicators, wherein the at least one output block further includes the fourth indicator.

In one embodiment, responsive to the at least one input block ending with a control symbol, the method further includes compressing a last control symbol of the at least one input block and combining the first indicator, the second indicator, and the compressed last control symbol into a transcoded symbol of the at least one output block.

In one embodiment, determining the first indicator includes setting a most significant bit of a first symbol of the at least one output block to represent the first indicator.

In one embodiment, determining the second indicator includes setting a least significant bit of a first control symbol of the at least one output block to represent the second indicator.

BRIEF DESCRIPTION OF THE DRAWINGS

The teachings of the embodiments disclosed herein can be readily understood by considering the following detailed description in conjunction with the accompanying drawings.

FIG. 2 is a block diagram depicting an exemplary 64b/66b transcoding scheme, according to one embodiment.

FIG. 3 is a block diagram depicting an exemplary 40b/42b transcoding scheme, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure relate to transcoding an input stream of data in accordance with Universal Synchronous Bus 3.0 (USB3) standard or other related standards. The input stream includes a sequence of blocks comprising data symbols and control symbols, where each block is of a fixed length (e.g., 64-bit or 8-byte long). Each input block is transcoded to achieve a low coding overhead. For example, a 64b/66b transcoding method has a coding overhead of 3.125%. Each output block of the transcoded stream includes a plurality of indicators to indicate locations of the data symbols and the controls symbols of each input block. The transcoded stream can be transmitted to a receiver, and the received transcoded stream is then decoded to recover the input stream.

Figure 1:
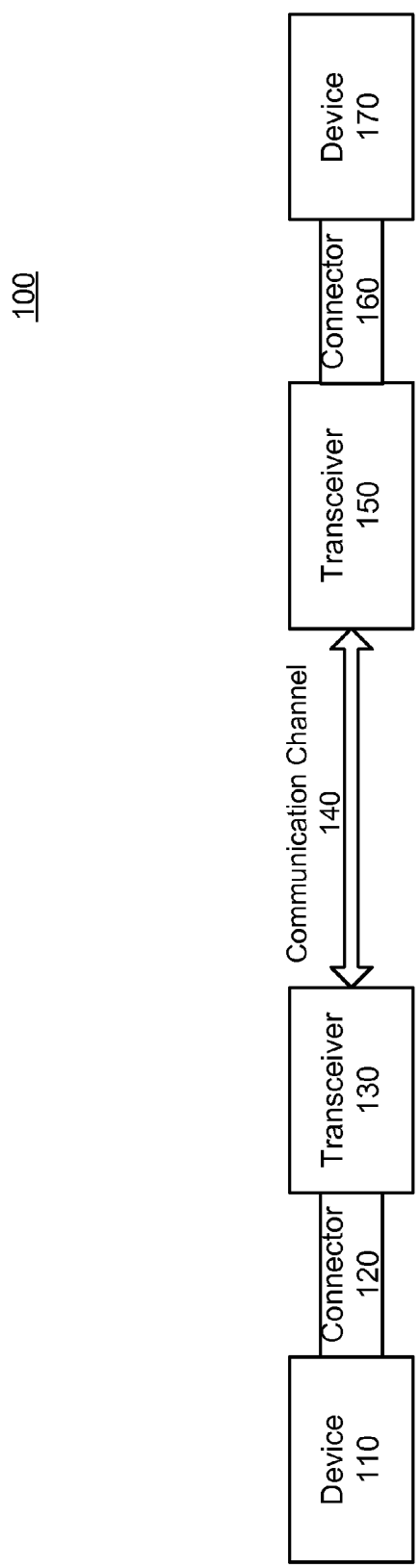
FIG. 1 is a high-level block diagram of a system for transcoding data, according to one embodiment.

FIG. 1 depicts a high-level block diagram of a system 100 for transcoding data, according to one embodiment. System 100 can include, among other components, devices 110 and 170; connectors 120 and 160; and transceivers 130 and 150. System 100 can also include communication channel 140. Each pair of devices (devices 110 and 170), connectors (connectors 120 and 160) and transceivers (transceivers 130 and 150) can be identical to each other and can be configured to perform complimentary functions. For example, device 110, connector 120, and transceiver 130 can be configured to transmit a stream of data whereas device 170, connector 160, and transceiver 150 can be configured to receive a stream of data. Alternatively, transceiver 130 can be replaced with a dedicated transmitter associated with device 110 and transceiver 150 can be replaced with a dedicated receiver associated with device 170.

Devices 110 and 170 can be specialized devices that can either generate data themselves or pass on data that was generated remote from devices 110 and 170. Devices 110 and 170 are described in connection with FIG. 10 below. An input stream of data to be transmitted reaches transceiver 130 through connector 120. Transceiver 130 (and transceiver 150) comprises a transmitter module (not shown) and a receiver module (not shown). The transmitter module transmits data while the receiver module receives data. A module can be implemented in either hardware, software, or a combination of hardware and software (i.e., firmware). In some embodiments, transceiver 130 is completely encompassed within device 110 and transceiver 150 is completely encompassed within device 170.

Device 110 can transcode an input stream of data into a transcoded stream of data before transmitting the data through transceiver 130. Transcoding is a process of converting data from one encoding to another, and encoding is a process of converting information from one format or code to another. Transcoding is typically performed when a target device does not support information's format at its source and needs to be converted into another format that is supported by the target device. Transcoding may also be performed for other reasons, for example, to reduce cost, reduce power consumption, improve spectral efficiency, narrow signal spectrum, or to simplify the operations of circuits or devices subsequent in the signal path. The input stream, according to an embodiment, is in accordance with Universal Synchronous Bus 3.0 (USB3) standard. It will be understood that the input stream described throughout this disclosure is in accordance with USB3 except as otherwise indicated. The transcoded stream is transmitted by transceiver 130 through communication channel 140 to a receiving device (e.g., device 170) through transceiver 150 and connector 160. Communication channel 140 is a bandwidth-limited channel and can be either a wired channel or a wireless channel. Once the transmitted transcoded stream is received by device 170, the transcoded stream can be decoded to identify the input stream of data. In some embodiments, the decoding is performed by device 170. Alternatively, decoding can be performed by a device remote to device 170.

Figure 2:
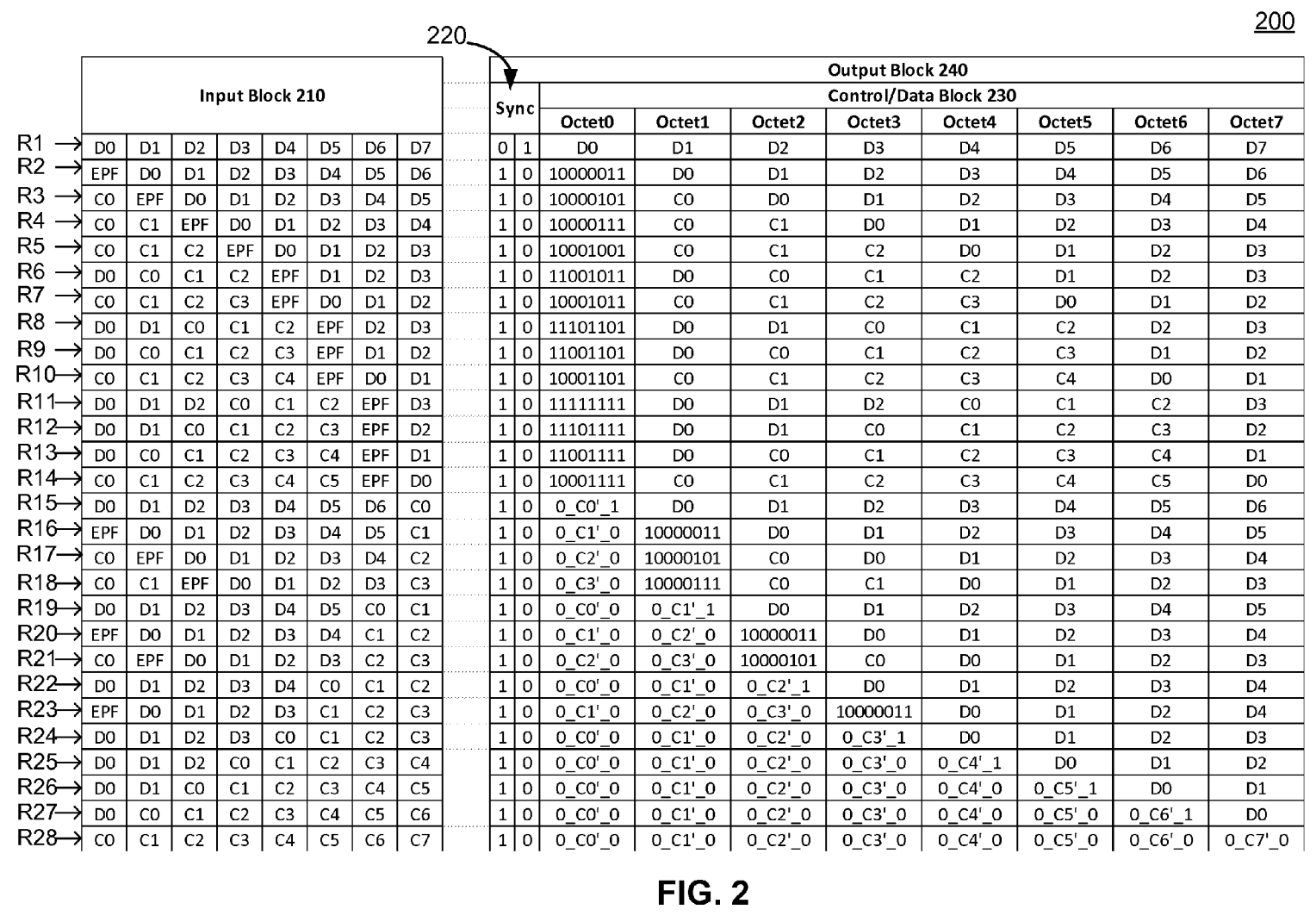

FIG. 2 a block diagram depicting an exemplary 64b/66b transcoding scheme, according to one embodiment. An input stream of data that is to be encoded comprises of a plurality of blocks of data, where each input block is of a fixed length. For example, in a 64b/66b transcoding scheme, each input block is 64-bit long. In the depicted 64b/66b transcoding scheme, a 2-bit sync portion is added to each 64-bit input block of data (divided into eight 8-bit "symbols" also referred to herein as "octets", or generally also referred to as "byte") to generate a 66-bit block of output stream of data corresponding to the 64-bit input block. Because 2-bits are added to every 64-bit input block, the coding overhead of a 64b/66b transcoding scheme is 3.125% (i.e., (66-64)/64*100), which is much lower than that of 8b/10b transcoding (25%). FIG. 2 represents a 64b/66b transcoding scheme for input block 210 in USB3 standard format.

The USB3 standard places various constraints on encoding an input stream of data comprising a plurality of 64-bit blocks of input data. First, for a given 64-bit block of input data comprising eight octets, data symbols can begin at any of the eight octets. A second constraint is placed on control symbols such that the input stream comprises groups of control symbols, where each group of control symbols comprises at least four consecutive control symbols. Each group of controls symbols can include at least three general control symbols and can end with a delimiter control symbol. For example, a delimiter control symbol can be an End Packet Framing (EPF) symbol that signifies a transition from a control symbol to a data symbol. In some embodiments, all symbols of the group of control symbols are comprised in one 64-bit input block. Alternatively, consecutive control symbols of the group of control symbols can be comprised in two or more successive 64-bit input blocks.

A third constraint is placed on data symbols such that the input stream comprises groups of data symbols, where each group of data symbols comprises at least four consecutive data symbols. In some embodiments, all symbols of the group of data symbols are comprised in one 64-bit input block. Alternatively, consecutive data symbols of the group of data symbols can be comprised in two or more successive 64-bit input blocks. A fourth constraint states that a transition from a control symbol to a data symbol must use an EPF symbol as a delimiter control symbol. A fifth constraint states that there will be no delimiter symbol to transition from a data symbol to a control symbol.

Given the above-stated constraints, there are 28 different possible combinations of data symbols and control symbols that can appear in 8 consecutive symbols of USB3 data. FIG. 2 shows a mapping from each possible combination of a 64-bit input block of a USB3 input stream to its encoded output according to the 64b/66b transcoding scheme described herein. Each row of FIG. 2 represents a different combination of data and control symbols in the 64-bit input block and its corresponding transcoded output block for a total of 28 rows labelled as R1 through R28. Each possible block of input data 210 can comprise both data symbols and control symbols. A "data symbol" as used herein is an octet (i.e., 8-bits or generally referred to as a byte) representing information transmitted over a communication channel. A "control symbol" as used herein is a special symbol that provides contextual information relating to achieving symbol alignment and is used for framing data and managing a communication link. In the original USB3 10-bit mapping of each symbol, special characteristics make control symbols uniquely identifiable from data symbols. For example, a control symbol may be used to indicate, for example, start-of-frame, end-of-frame, link idle, skip and similar link-level conditions associated with data symbols transmitted over the communication channel. In FIG. 2, data symbols are represented as Dk, where k ranges from 0 through 7. Control symbols of the input blocks 210 and the control/data block portion 230 of the output are represented as Ck, where k ranges from 0 through 7. The input blocks 210 can also comprise a delimiter control symbol that is represented as EPF. For example, EPF can signify a transition from a control symbol to a data symbol.

The output blocks 240 each comprise a synchronization block 220 and a control/data block 230 comprising eight octets (octet0 through octet7). Synchronization block 220 comprises a 2-bit sync portion that provides an indication whether there is at least one control symbol in the corresponding input block 210 being encoded. For example, if there is no control symbol in the corresponding input block 210 the 2-bit sync portion is set to a value of "01," as depicted in row R1 of FIG. 2. If, however, there is at least one control symbol in the corresponding input block 210, the 2-bit sync portion is set to a value of "10," as depicted in every row other than row R1 of FIG. 2. In alternative embodiment, the 2-bit sync portion can be set to different values (e.g., 10 for no control symbol and 01 for at least one control symbol). Alternatively, synchronization block 220 can comprise 1-bit or more than 2-bits (thereby changing coding overhead) to indicate the presence of (or lack of) control symbols in the input block 210 being encoded.

Each output block 240 also comprises a control/data block 230 that includes eight octets representing a transcoded version of the eight symbols of the corresponding input block 210 being encoded. Each octet is 8-bit long and typically represents either a data symbol or a control symbol. In some instances, control symbols of a given input block 210 are represented with a modified version of the control symbol in the corresponding control/data block 230. For example, the first symbol of the input block 210 in row R28 is represented by C0. In control/data block 230, input control symbol C0 is represented as 0_C0'_0. Here, C0' represents a 6-bit compressed version of the 8-bit C0. The additional leading and trailing bits ('0' in this instance) can be used as an indicator to represent additional information as will be described in further detail below. In alternative embodiments, the control symbols can be represented by a fewer than or more than 6-bits. In alternative embodiments, the indicator may be in positions other than the leading and trailing bits of the octet. Control/data block 230 also comprises, for some rows, an octet represented by ones and zeroes (e.g., octet0 of row R2). Control/data block 230's octet0 of row R2 can be a pattern indicator that can indicate various features of the corresponding input block 210. For example, the pattern indicator can indicate whether the input block 210 ends with a control symbol or a data symbol as shown in control/data block 230 using the leading bit of octet0. Alternatively or in addition, the pattern indicator can indicate in a control symbol of the output block 240 whether the remaining symbols of the output block 240 comprise control symbols as shown, for example in control/data block 230, using the trailing bit of octet0. In alternative embodiments, the pattern indicator can indicate other features within the scope of this disclosure.

FIG. 3 is a block diagram depicting an exemplary 40b/42b transcoding scheme for USB3 data, according to one embodiment. In a 40b/42b transcoding scheme, a 2-bit sync portion is added to each 40-bit input block to generate a 42-bit output block corresponding to the 40-bit input block. Because 2 bits are added to every 40-bit input block, the coding overhead of a 40b/42b transcoding scheme is 5% (i.e., (42-40)/40*100), which is much lower than that of 8b/10b transcoding (25%). FIG. 3 represents a 40b/42b transcoding scheme for input block 310 in USB3 standard format.

In light of the constraints associated with USB3 data, as described above with reference to FIG. 2, there are 10 different possible combinations of data symbols and control symbols that can appear in an octet of USB3 data. FIG. 3 shows a mapping from each possible combination of a 40-bit input block of a USB3 input stream to its encoded output block 340 according to the 40b/42b transcoding scheme described herein. Each row of FIG. 3 represents a different combination of data and control symbols in the 40-bit input block and its corresponding transcoded output block for a total of 10 rows labelled as R1 through R10. Each possible block of input data 310 can comprise both data symbols and control symbols conforming to restrictions specified by USB3 protocol. In FIG. 3, data symbols are represented as Dk, where k ranges from 0 through 4. Control symbols of the input blocks 310 are represented as Ck, where k ranges from 0 through 4. The input blocks 310 can also comprise a delimiter control symbol that is represented as EPF. For example, EPF can signify a transition from a control symbol to a data symbol.

The input blocks 310 are similar to the input blocks 210 and the output blocks 340 comprises a synchronization block 320 and a control/data block 330, similar to the output blocks 240 as described above with reference to FIG. 2. The main difference between FIG. 2 and FIG. 3 is that while FIG. 2 depicts a transcoding scheme on a 64-bit input block, FIG. 3 depicts a transcoding scheme on a 40-bit input block. Consequently, control/data block 330 comprises five octets (e.g., octet0 through octet4) as opposed to eight octets of control/data block 230. Accordingly, all features described in FIG. 2 above, are equally applicable with regards to FIG. 3.

Figure 4:
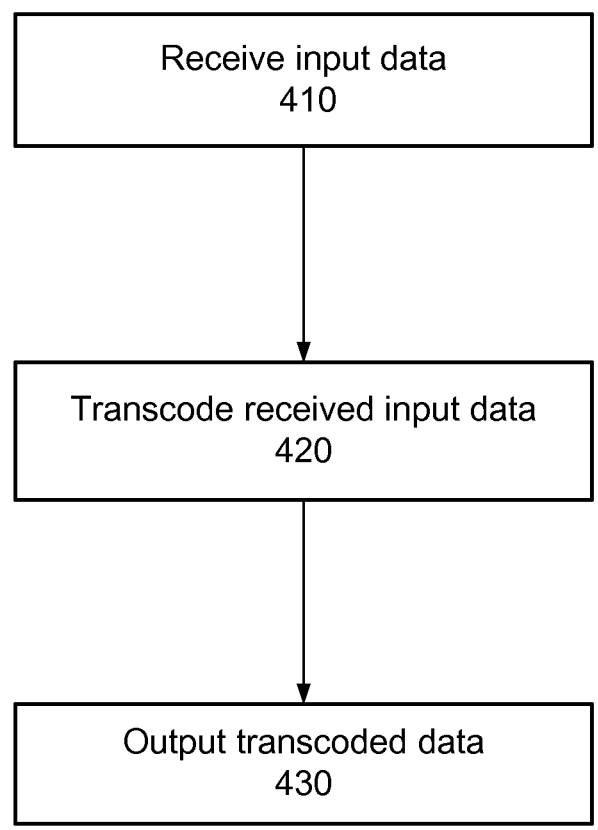
FIG. 4 is a flow chart depicting a method for transcoding data, according to one embodiment.

FIG. 4 is a flow chart depicting a method for transcoding a stream of data, according to one embodiment. First, an input stream of data is received 410 at a device (e.g., device 110). In some embodiments, the device itself can generate the input stream. The input stream can be partitioned into a sequence of blocks having a fixed length. For example, each sequence of blocks can have a fixed length of 64-bits. Alternatively, the fixed length can be 128-bits. Each block of the input stream can comprise one or more data symbols and one or more control symbols. Control symbols can comprise a general control symbol and a delimiter control symbol. A general control symbol can be control symbols that comprise a byte used to indicate, for example, start-of-frame, end-of-frame, link idle, skip and similar link-level conditions associated with data symbols transmitted over the communication channel. A delimiter control symbol, for example, can signify a transition from a general control symbol to a data symbol. In USB3 data, an exemplary delimiter control symbol is End Packet Framing (EPF) symbol that signifies a transition from a general control symbol to a data symbol.

The input stream is then transcoded 420 according to a procedure to convert the input stream into another format that is supported by the target device. An exemplary procedure for transcoding input stream is described with reference to FIGS. 5 through 9 below. The transcoded stream of data is then output 430 to transmit the transcoded stream to the target device for further processing. In some embodiments, the device receiving (or generating) the input stream also transcodes the input stream and further transmits the transcoded stream. Alternatively, transcoding and transmitting is performed by a device that is different from the device receiving (or generating) the input stream.

Figure 5:
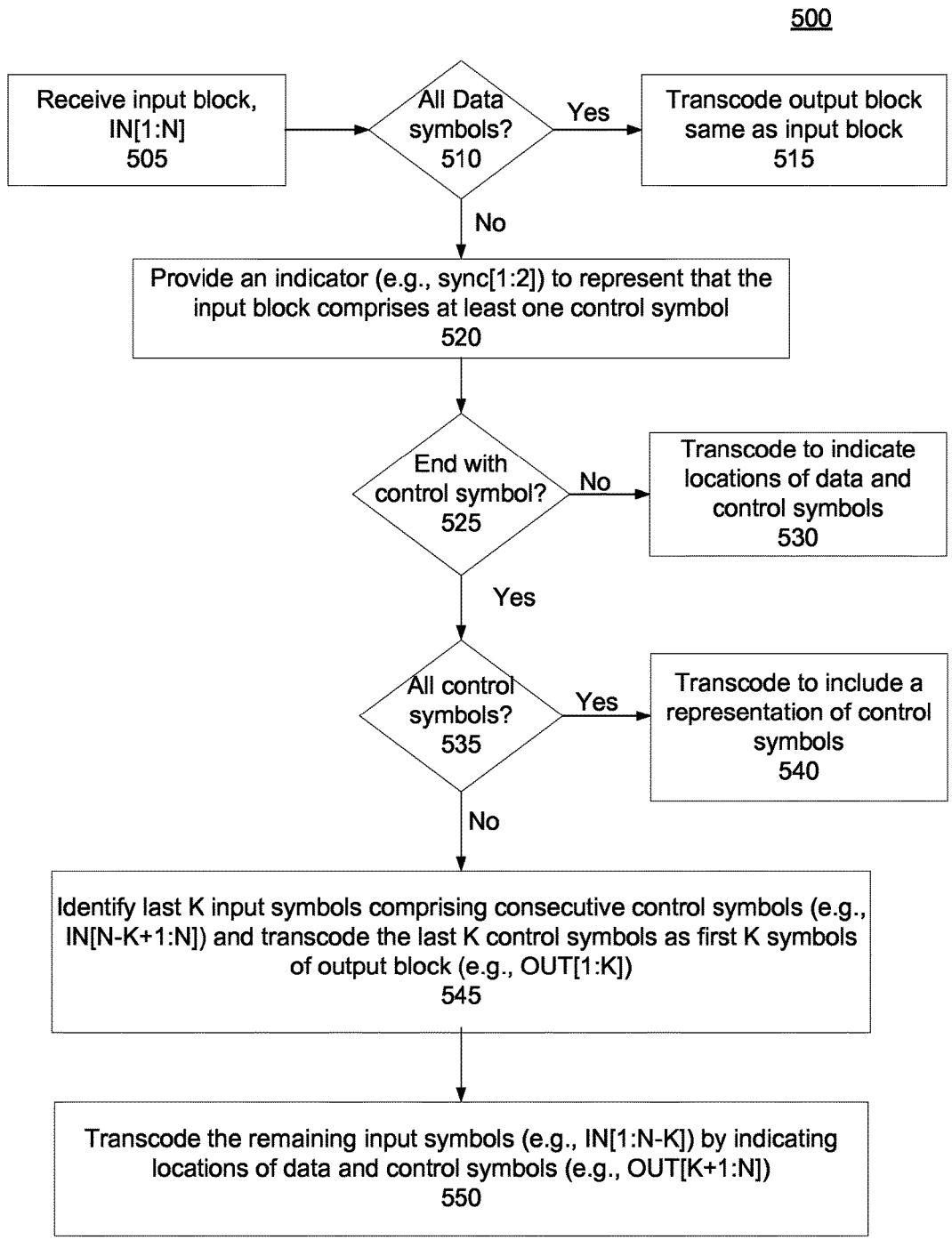
FIG. 5 is a flow chart depicting a method for transcoding data, according to one embodiment.

FIG. 5 is a flow chart depicting a method for transcoding a block of an input stream of data, according to one embodiment. The transcoding of the input block can be performed by a transcoder (e.g., transcoder 1050) as described later with reference to FIG. 10. The transcoding method begins by receiving 505 a block of USB3 input data having a fixed length of N bytes, depicted as IN[1:N]. For example, IN[1:N] can be an eight-octet (64-bit) long block of input data corresponding to one of the input blocks 210 depicted in FIG. 2. The received input block typically comprises data symbols and may also include one or more control symbols as described above with reference to FIG. 4. The transcoder then determines 510 whether the received input block includes only data symbols (e.g., whether the input block corresponds to row R1 in the mapping table of FIG. 2 or row R1 in the mapping table of FIG. 3). If the transcoder determines that the received input block includes only data symbols (i.e., no control symbols), the input block is transcoded 515 such that a control/data block of the transcoded output block is the same as the received input block. The process of transcoding 515 is described in further detail with reference to FIG. 6.

Figure 6:
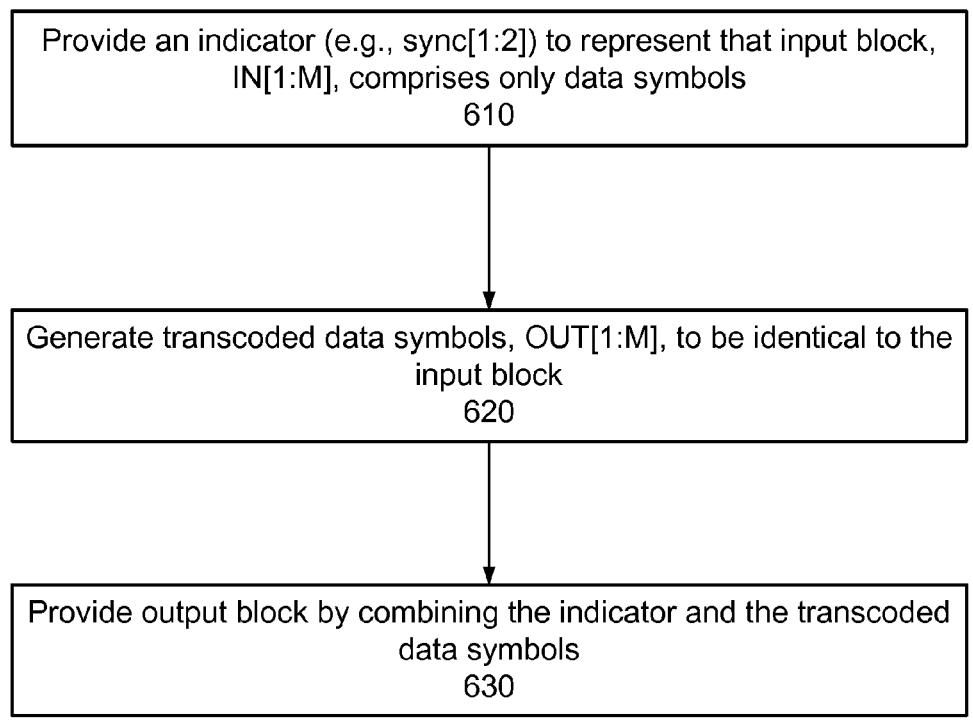
FIG. 6 is a flow chart depicting a method for transcoding data when input block comprises only data symbols, according to one embodiment.

FIG. 6 is a flow chart depicting a method for transcoding data when input block comprises only data symbols, according to one embodiment. When a determination is made that the input block comprises only data symbols, an indicator can be provided 610 to indicate that the input block comprises only data symbols and does not comprise any control symbols. For example, in a 64b/66b encoding, synchronization block 220 corresponding to row R1 of FIG. 2 includes an 2-bit sync indicator (e.g., sync[1:2]) with a value "01" signifying that the input block corresponding to row R1 includes only data symbols and no control symbols. FIG. 6 depicts the received input block as IN[1:M], where the length of the received input block is M bytes. In some embodiments, M is the same as N bytes of FIG. 5. Alternatively M can be different from N.

Next, each symbol of the input block, IN[1:M], is transcoded to generate 620 transcoded symbols of a control/data block, OUT[1:M]. The generated transcoded symbols of the control/data block, OUT[1:M], are identical to the symbols of input block, IN[1:M]. For example, row R1 of FIG. 2 depicts control/data block OUT[1:M] from octet0 to octet7 such that each of the octets of the control/data block are identical to their corresponding octets of the input block. Next, an output block is provided 630 by combining the provided indicator (i.e., sync[1:2]) and generated control/data block (i.e., OUT[1:M]). For example, row R1 of FIG. 2 depicts output block that combines synchronization block 220 indicating "01" and control/data block 230 comprising symbols that are identical to their corresponding symbols of input block 210.

Referring back to FIG. 5, if the transcoder determines that the received input block includes at least one control symbol (e.g., the input block corresponds to any of rows R2-R28 in the 64b/66b example of FIG. 2, or the input block corresponds to any of rows R2-R10 in the 402/42b example of FIG. 3), an indicator can be provided 520 to indicate that the input block comprises at least one control symbol. For example, synchronization block 220 corresponding to row R2 of FIG. 2 includes an 2-bit sync indicator with a value "10" signifying that the input block corresponding to row R2 includes at least one control symbol (i.e., EPF symbol represented by the first octet of input block 210). Next, the transcoder determines 525 whether the received input block ends with a control symbol (e.g., whether the input block corresponds to any of rows R15-R28 in the example of FIG. 2 or rows R6-R10 in the example of FIG. 3). If the transcoder determines that the received input block does not end with a control symbol (i.e., ends with a data symbol as in rows R2-14 in FIG. 2 or rows R2-R5 in FIG. 3), the input block is transcoded 530 such that a control/data block corresponding to the transcoded output block includes a plurality of pattern indicators to indicate locations of data and control symbols of input block.

After a determination is made that the input block ends with either a data symbol or a control symbol, one of the symbols (e.g., an octet of the eight octets) of the output block can be generated to include a first indicator to indicate whether the input block ends with a control symbol or a data symbol. For example, the first indicator indicates whether the input block ends with a control symbol or a data symbol by using a bit of a symbol of the output block. In some embodiments, the symbol comprising the bit of the first indicator can be the first octet (e.g., octet0 of control/data block 230). For example, the most significant bit (MSB) of octet0 (i.e., the first bit) represents the first indicator. Input block 210 of row R6 of FIG. 2 ends with a data symbol D3 and the MSB representing the first indicator has a value of "1." Another example of row R18 of FIG. 2 depicts that input block 210 ends with control symbol C3 and the MSB representing the first indicator has a value of "0." In one embodiment, the first indicator can represent a value of "1" to indicate that input block 210 ends with a control symbol and a value of "0" to indicate that input block 210 ends with a data symbol. The first indicator can be included in a bit other than MSB of a symbol and also in a symbol other than the first octet of the control/data block corresponding to the output block. The process of transcoding 530 is described in further detail with reference to FIG. 7.

Figure 7:
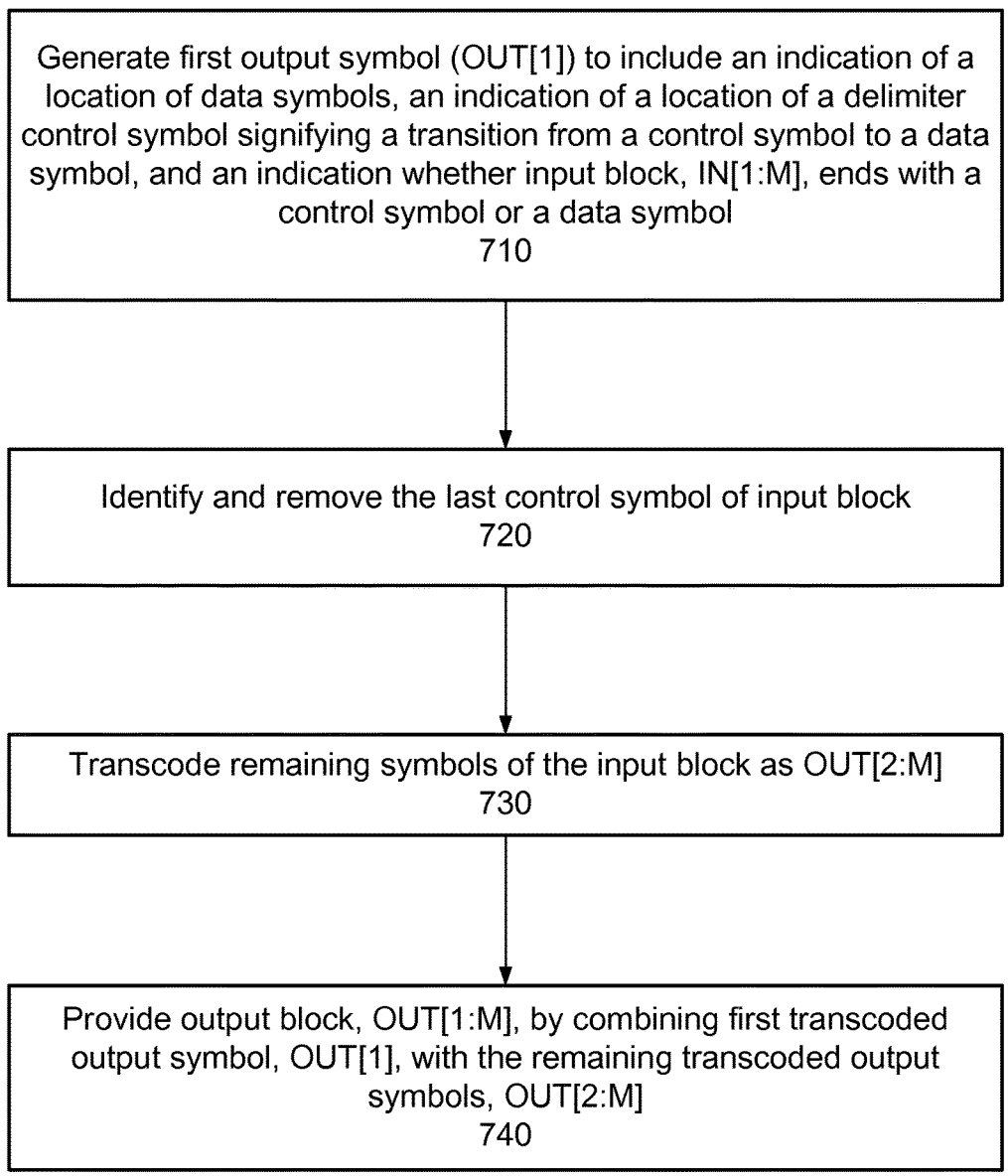
FIG. 7 is a flow chart depicting a method for transcoding data when input block ends with a data symbol, according to one embodiment.

FIG. 7 is a flow chart depicting a method for transcoding data when the input block includes at least one control symbol and when the input block ends with a data symbol, according to one embodiment. In the example 64b/66b encoding of FIG. 2, this process is performed when the input block corresponds to any of rows R2-R14, and in the example 40b/42b encoding of FIG. 3, this process is performed when the input block corresponds to any of rows R2-R5. FIG. 7 depicts the received input block as IN[1:M], where the length of the received input block is M bytes. In some embodiments, M is the same as N bytes of FIG. 5.

Alternatively M can be different from N. When a determination is made that the input block ends with a data symbol, one of the symbols (e.g., an octet of the eight octets of the output block) of the output block can be generated 710 to include a plurality of indicators further including a first indicator to indicate that the input block ends with a data symbol, a second indicator to indicate a location of a delimiter control symbol in the input block, and a third indicator to indicate a location of any data symbols appearing before control symbols in the input block. In one embodiment, the plurality of the indicators are included in the first symbol (e.g., octet0) of a control/data block (e.g., control/data block 230 of FIG. 2) of the output block. Alternatively, the plurality of indicators can be included in other symbols of the output block. The first, second, and third indicators are each represented by one or more bits of an indicator symbol (e.g., octet0) that are specifically assigned to that their respective indicators. For example, in one embodiment, the first (most significant) bit represents the first indicator, the next three bits represent the second indicator, the next three bits represent the third indicator, and the last (least significant) bit represents a fourth indicator (i.e., a control indicator) discussed in further detail below with reference to FIGS. 8 and 9. In one embodiment, the second and third indicators can be combined into a single indicator.

The first indicator indicates that the input block ends with a data symbol by using a bit of the first octet (e.g., octet0 of control/data block 230). The second indicator indicates a location of a delimiter control symbol in the input block by using one or more bits of a symbol of the output block. In some embodiments, the symbol comprising the one or more bits of the second indicator can be the first octet (e.g., octet0 of control/data block 230). For example, bits 5 through 7 of octet0 of control/data block 230 represent the second indicator, where bit 8 is the MSB in the left and bit 1 is the LSB in the right. Row R6 of FIG. 2 includes a delimiter control symbol, EPF, in the fifth octet (i.e., octet4) of input block 210. In USB3 data, EPF (a delimited control symbol) signifies a transition from control symbols to data symbols such that an EPF symbol immediately precedes a data symbol. Bits 5 through 7 of octet0 of control/data block 230 of row R6 indicate the location of EPF by a value of "101." In this exemplary embodiment, bits 5 through 7 represent a binary-weighted representation of the location of the EPF symbol. In row R6 of FIG. 2, the EPF symbol is the fifth octet of input block 210. A 3-bit binary-weighted representation of decimal value five is "101." Another example of row R12 of FIG. 2 depicts that delimiter control symbol, EPF, appears in the seventh octet (i.e., octet6) of input block 210. Bits 5 through 7 of octet0 of control/data block 230 of row R12 indicate the location of the EPF symbol by a binary-weighted value of "111."

The third indicator can indicate a location of data symbols that appear before a control symbol (including general control symbols and delimiter control symbols) in the input block by using one or more bits of a symbol of the output block. In some embodiments, the symbol comprising the one or more bits of the third indicator can be the first octet (e.g., octet0 of control/data block 230). For example, bits 2 through 4 of octet0 of control/data block 230 represent the third indicator. Row R6 of FIG. 2 includes a data symbol D0 in the first octet (i.e., octet0) of input block 210 before a first control symbol (i.e., C0 in octet1) appears in input block 210. Bits 2 through 4 of octet0 of control/data block 230 of row R6 indicate the location of data symbol D0 by a value of "100." Another example of row R12 of FIG. 2 depicts that input block 210 includes two data symbols (i.e., D0 in octet0 and D1 in octet1) before a first control symbol (i.e., C0 in octet2) appears in input block 210. Bits 2 through 4 of octet0 of control/data block 230 of row R12 indicate the location of data symbols D0 and D1 by a value of "110." In some embodiments, the second and third indicators can include fewer than or more than three bits used in the exemplary embodiment of FIG. 2. The second and third indicators can be included in a symbol other than the first octet of the control/data block corresponding to the output block as depicted in FIG. 2.

Next, the delimiter control symbol (i.e., the last control symbol) of the input block is identified and removed 720 from the symbols to be transcoded. When input block ends with a data symbol in USB3 data, the last control symbol of the input block is a delimiter control symbol (e.g., EPF symbol). While the EPF symbol is being removed from the symbols that will be transcoded as output block, an indication of the location of the EPF symbol is still provided in the output block as discussed above with reference to transcoding 710. One method of identifying the EPF symbol can be by identifying a predetermined pattern associated with the EPF symbol. An example depicting the identification and removal of EPF is shown in row R6 of FIG. 2, which includes the EPF symbol as the fifth symbol (i.e., octet4) of input block 210. As can be seen in control/data block 230 of row R6, the EPF symbol is removed.

Next, the remaining seven symbols of the input block are transcoded 730. In one embodiment where the plurality of indicators are represented in the first symbol of the control/data block of the output block (i.e., OUT[1] of OUT[1:8]), the remaining seven symbols (other than EPF symbol) can be transcoded as the last seven symbols of the output block (i.e., OUT[2:8]). The last seven symbols of the output block can be transcoded such that the output block symbols are identical to the input block symbols after removal of the EPF symbol. For example, row R6 of FIG. 2 includes an EPF symbol as the fifth symbol of input block 210. After removing the EPF symbol (i.e., IN[5]) as described with reference to step 720 above, the input block is left with IN[1:4] and IN[6-8]. As depicted in control/data block 230 of row R6 of FIG. 2, the remaining seven symbols of input block 210 (i.e., IN[1:4] and IN[6:8]) are transcoded as OUT[2:8]. Accordingly, IN[1:4] is mapped to OUT[2:5] and IN[6:8] is mapped to OUT[6-8].

After removing the delimiter control symbol and transcoding the remaining seven input block symbols as the last seven output block symbols, the first symbol of the output block (OUT[1] including the plurality of indicators) and the last seven output block symbols (OUT[2:8]) are combined 740 to provide all eight symbols of the output symbol (OUT[1:8]). For example, row R6 of FIG. 2 depicts an output block by combining the first symbol (i.e., OUT[1] or octet0) showing "11001011" (representing the plurality of indicators) with that of control/data block 230 showing a sequence of symbols "D0 C0 C1 C2 D1 D2 D3 D4" corresponding to OUT[2:8] (i.e., octet1:octet7). In another embodiment, the control symbols of R3 to R14 may be compressed or coded in another format, to improve error resilience. Control code compression is described in more details in FIG. 8.

Referring back to FIG. 5, if the transcoder determines 525 that the received input block ends with a control symbol, the transcoder further determines 535 whether all symbols of the input block are control symbols (i.e., no data symbols). If the transcoder determines that the received input block includes only control symbols, the input block is transcoded 540 to include a representation of the control symbols of the input block in the output block. The process of transcoding 540 is described in further detail with reference to FIG. 8.

Figure 8:
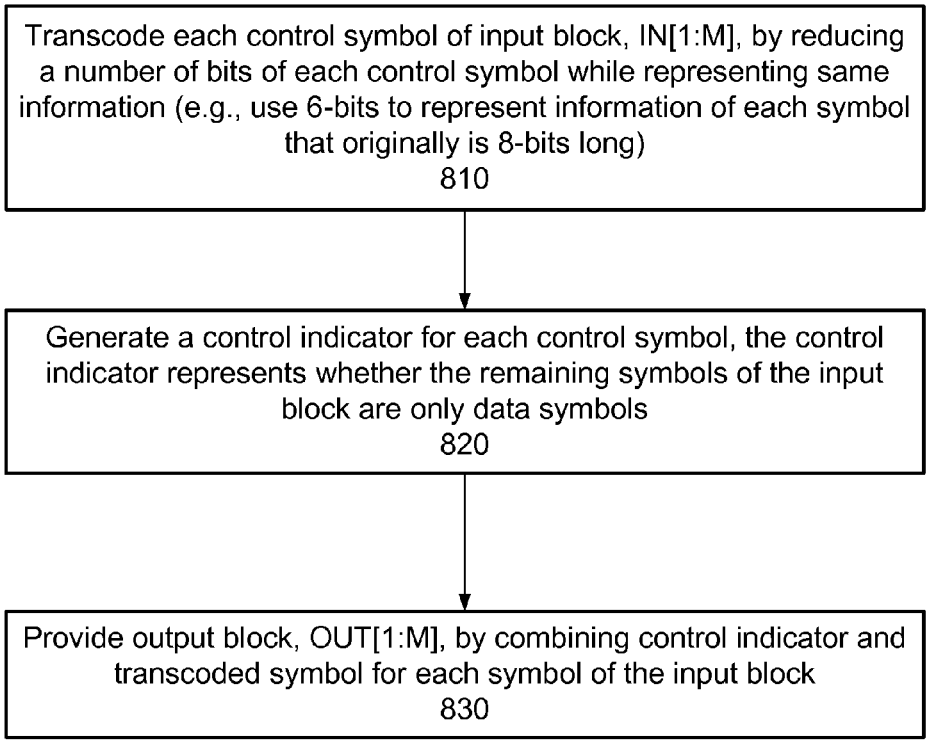
FIG. 8 is a flow chart depicting a method for transcoding data when input block comprises only control symbols, according to one embodiment.

FIG. 8 is a flow chart depicting a method for transcoding data when input block comprises only control symbols, according to one embodiment. FIG. 8 depicts the received input block as IN[1:M], where the length of the received input block is M bytes. In some embodiments, M is the same as N bytes of FIG. 5. Alternatively M can be different from N. When a determination is made that the input block (i.e., IN[1:M]) includes only control symbols (e.g., the input block corresponds to row R28 in the 64b/66b example of FIG. 2, or the input block corresponds to row R10 in the 402/42b example of FIG. 3), each control symbol of the input block is transcoded 810 such that each symbol of the output block provides a representation of the control symbols of the input block. One method of providing such representation is by reducing a number of bits used to represent information in each control symbol while still representing the same information. For example, each transcoded control symbol's information can be represented in 6-bits to represent the same information of each symbol that originally is 8-bits long in the input block as depicted in row 28 of FIG. 2. Row 28 depicts all control symbols (i.e., C0:C7) for input block 210 and a control/data block 230 of the transcoded output that depicts a representation of the input control symbols (i.e., 0_C0'_0:0_C7'_0). Here, C0' and C7' represent a 6-bit compressed version of input control symbols, C0 and C7, that are originally 8 bits long. For USB3 data, there can be a total of 16 different types of control symbols including general control symbols and delimiter control symbols. While 4 bits are sufficient to uniquely represent each of the 16 different USB3 control symbols, using 6 bits will enable the transcoder to use 2 bits for other features like error correction or error detection.

Next, for each input control symbol, a control indicator is generated 820 to indicate whether the remaining symbols positioned after the control symbol of the input block comprise only data symbols or comprise at least one control symbol. In an exemplary embodiment where 6 bits are used in the transcoded control symbol to represent the information of the input control symbol, one or both of the two remaining bits can be used for the control indicator. For example, FIG. 2 depicts bits 1 and 8 of transcoded control symbol are used for control indicator as shown in row 28. Input block 210 of row 28 includes all control symbols. Because all input symbols are control symbols (i.e., no data symbols), the control indicator for each of the transcoded output symbols provides an indication that there are no data symbols. In row 28 of FIG. 2, the control indicator (bits 1 and 8) has a value of "0_Ck_0" for all eight control symbols providing an indication that none of the symbols of the input block comprise a data symbol. After providing a representation of each control symbol and generating a control indicator for each control symbol, all eight control symbols are combined 830 to provide the transcoded output block (OUT[1:8]).

Referring back to FIG. 5, if transcoder determines 535 that all symbols of the input block are not control symbols (i.e., input block ends with a control symbol but includes at least one data symbol), then the last K number of input symbols (i.e., IN[N−K+1:N]) comprising consecutive control symbols are identified and transcoded 545 as the first K number of symbols of the output block (i.e., OUT[1:K]). Next, the remaining input symbols (i.e., IN[1:N−K]) are transcoded 550 by indicating a location of data and control symbols of the remaining input symbols. The process of transcoding 545 and 550 are described in further detail with reference to FIG. 9.

Figure 9:
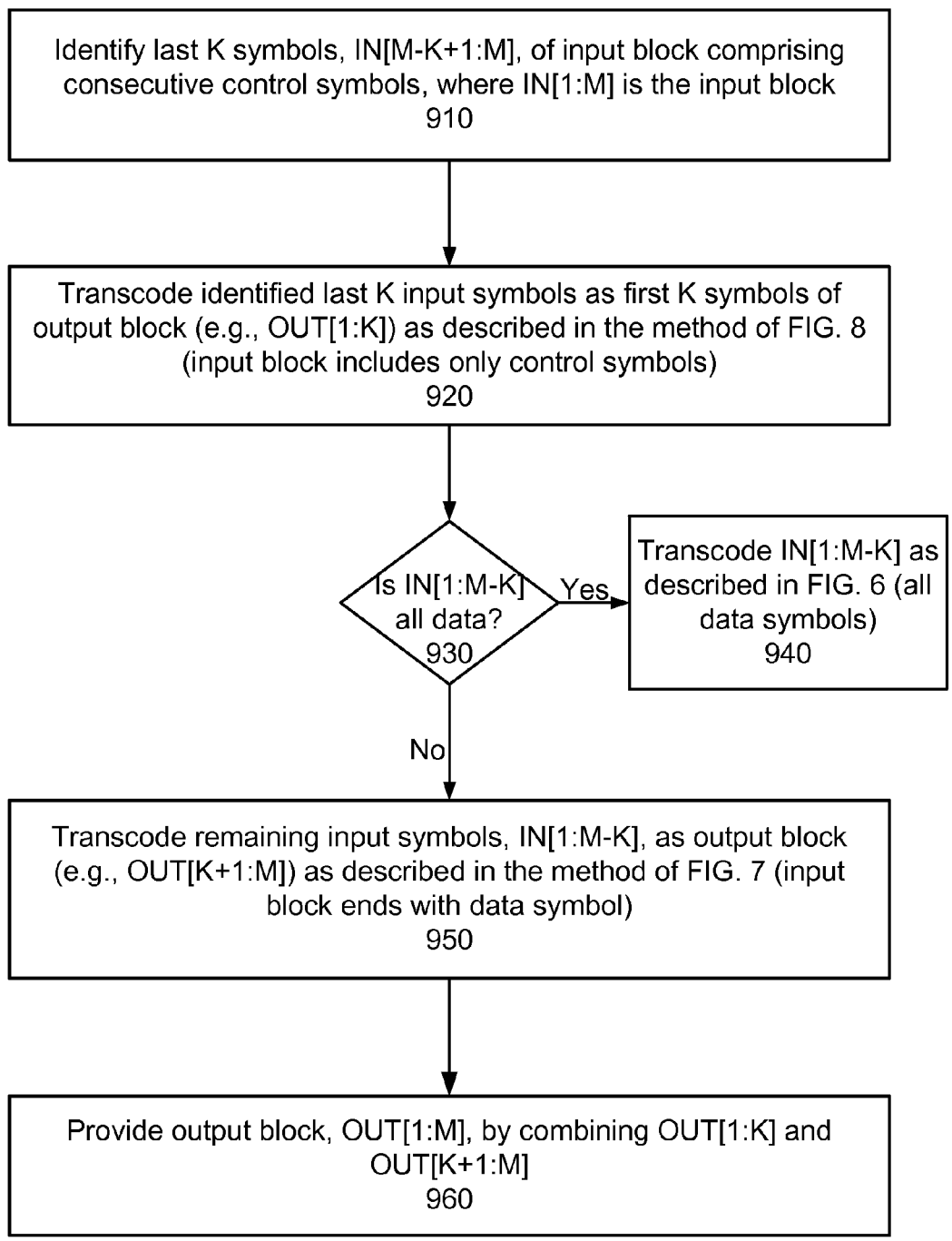
FIG. 9 is a flow chart depicting a method for transcoding data when input block ends with a control symbol and includes at least one data symbol, according to one embodiment.

FIG. 9 is a flow chart depicting a method for transcoding data when input block ends with a control symbol and includes at least one data symbol, according to one embodiment. When a determination 535 is made that the input block (i.e., IN[1:M]) ends with a control symbol and includes at least one data symbol (e.g., the input block corresponds to any of rows R15-R27 in the 64b/66b example of FIG. 2, or the input block corresponds to any of rows R6-R9 in the 402/42b example of FIG. 3), the last K symbols of the input block (i.e., IN[M−K+1:M]) that comprise consecutive control symbols are identified 910, where IN[1:M] is the input block to be transcoded. Identification 910 can begin with the last symbol of the input block (i.e., IN[M]), which is already identified as a control symbol. Identification 910 then proceeds to analyze whether the symbol immediately prior to the last symbol (i.e., IN[M−1]) is also a control symbol. Identification 910 continues this process until all consecutive control symbols from the end of the input block are identified. The number of identified consecutive control symbols from the end of the input block is represented by K, such that the symbols IN[M−K+1:M] are identified as the last K consecutive control symbols. For example, row 23 of FIG. 2 depicts input block 210 that includes three consecutive control symbols (C1, C2, and C3 as input symbols 6 through 8) at the end. In this example, M=8 and K is identified as 3. Accordingly, identification 910 will identify IN[6:8] as the last three input symbols as the last three consecutive control symbols from the end of the input block.

After identifying the last K input symbols (i.e., IN[M−K+1:M]), the identified last K input symbols are transcoded 920 as the first K symbols of the output block as described above with reference to FIG. 8. While the transcoding process of FIG. 8 describes transcoding of an input block, IN[1:M], the transcoding process is equally applicable to an input block of a different length, IN[M−K+1:M], with a length of M−K. For example, row 23 of FIG. 2 depicts input block 210 that includes three consecutive control symbols (C1, C2, and C3 as input symbols 6 through 8) at the end. In this example, M=8 and K is identified as 3. Accordingly, transcoding of FIG. 8 would transcode IN[6:8] in accordance with its method. After transcoding the identified last K input symbols (i.e., IN[M−K+1:M]), the transcoded last K input symbols are mapped as the first K symbols of the output block (i.e., OUT[1:K]). For the example of row 23 of FIG. 2, the last three consecutive symbols of the input block correspond to the first three symbols of the output block depicted as octet0 to octet2 of control/data block 230 of row 23.

One difference between the method described with reference to FIG. 8 and the transcoding of the identified last K consecutive symbols is that in FIG. 8, all symbols of the input block are only control symbols (i.e., no data symbols) and accordingly, the control indicator will indicate that there are no data symbols in the input block. While it is still correct that the last K symbols of the input with consecutive control symbols (i.e., IN[M−K+1:M]) also includes only control symbols, it is possible that the other symbols of the input block (i.e., IN[1:M−K]) can include one or more control symbols. In a case where the remaining symbols of the input block include only data symbols, the control indicator of the output symbol corresponding to the last symbol of the last K input symbols with consecutive control symbols (i.e., OUT[K] corresponding to IN[M]) will be modified if the remaining input symbols (i.e., IN[1:M−K])

only include data symbols. For example, row 19 of FIG. 2 depicts input block 210 that includes two consecutive control symbols (i.e., K=2) at the end of input block 210, and the other six symbols are data symbols. Control/data block 230 corresponding to row 19 depicts a representation of input block 210's control symbols (i.e., 0_C0_0 and 0_C1_1). The last control symbol in the K symbols (i.e., input symbol C1) depicts a "0" in its most significant bit (MSB) and a "1" in its least significant bit (LSB) to signify that the rest of the symbols of output block 240 are all data symbols. In other cases where remaining symbols include one or more data symbols but also include one or more control symbols, the control indicator of the output symbol (i.e., OUT[K−1]) corresponding to the last symbol of the last K input symbols with consecutive control symbols (i.e., IN[M]) need not be modified.

After transcoding 920 the identified last K input symbols as the first K symbols of the output block, the remaining symbols of the input block (i.e., IN[1:M−K]) are transcoded as the remaining symbols of the output block (i.e., OUT[K+1:M]) depending on whether the remaining symbols include only data symbols or not. Step 930 determines whether the remaining symbols (i.e., IN[1:M−K]) include only data symbols. If determination 930 returns that the remaining symbols only include data symbols, the remaining symbols are transcoded in accordance with the transcoding method described above with reference to FIG. 6. If on the other hand, determination 930 returns that the remaining symbols include at least one control symbol, the remaining symbols are transcoded as described above with reference to FIG. 7. While the transcoding process of FIG. 7 describes transcoding of an input IN[1:M], the transcoding process is equally applicable to an input block of different length, IN[1:M−K]. In row 23 of FIG. 2, for example, input block 210 includes three consecutive controls symbols at the end (i.e., K=8) and includes the remaining five symbols (i.e., EPF, D0, D1, D2, and D3) that end with a data symbol (i.e., D3). For this example, transcoding 950 will transcode IN[1:5] in accordance with transcoding method of FIG. 7 and map IN[1:5] and OUT[6:8], where OUT[5] would include a plurality of indicators indicating whether the remaining input symbols (i.e., IN[1:5]) ends with a control symbol or a data symbol, indicating a location of a delimiter control symbol (i.e., EPF symbol) in the remaining input symbols, and indicating a location of data symbols appearing before control symbols in the remaining input symbols.

After transcoding 940 or transcoding 950, where the remaining input symbols (i.e., IN[1:M−K]) are transcoded as the remaining symbols of the output block (i.e., OUT[K+1:M]), the first K symbols and the remaining symbols of the output block are combined 960 to provide the transcoded output block (OUT[1:8]).

Figure 10:
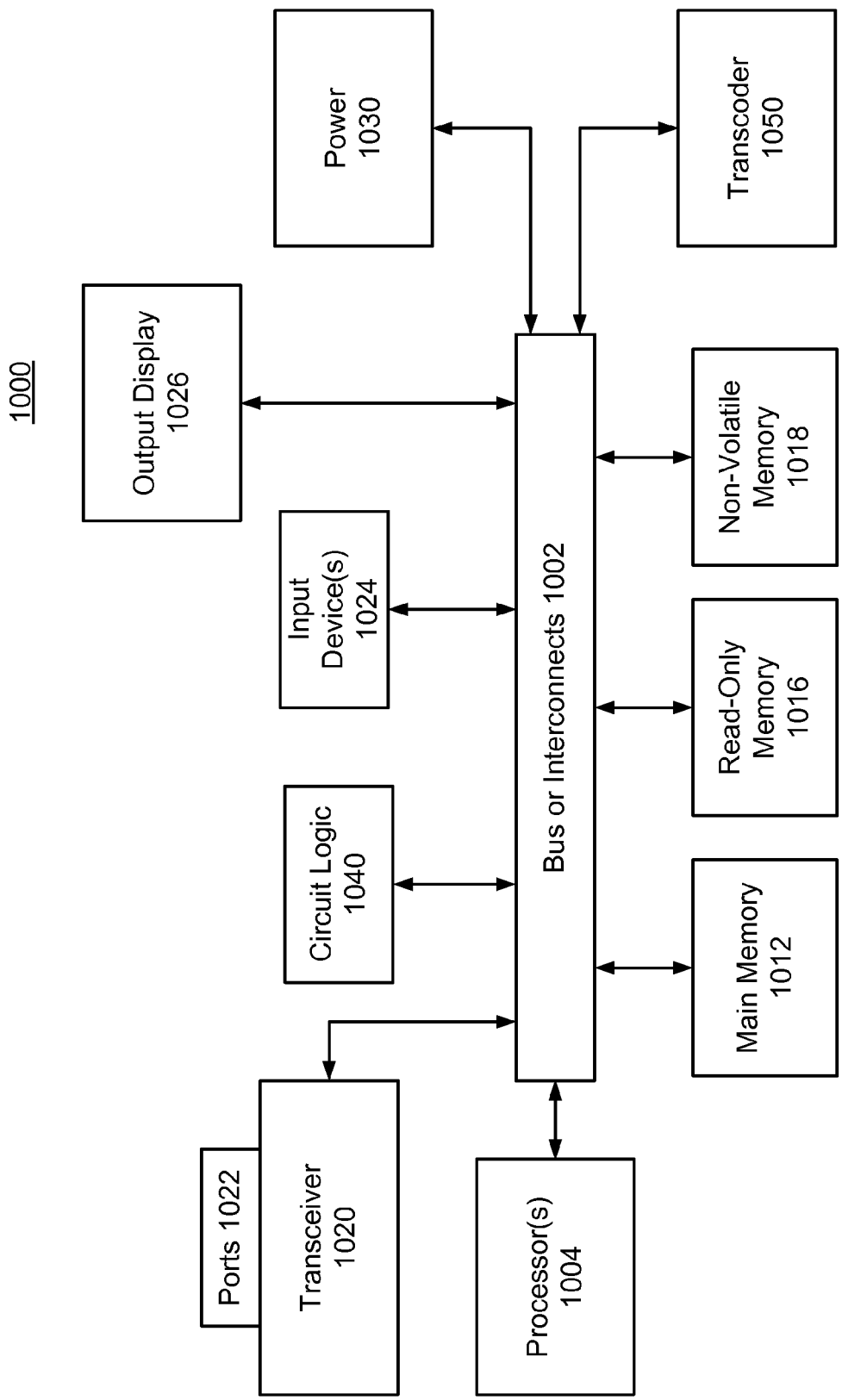
FIG. 10 is a block diagram of a device that performs transcoding of data, according to one embodiment.

FIG. 10 is a block diagram of a device (device 1000) that performs transcoding of data, according to one embodiment. Device 100 can correspond to either or both off devices 110 and 170 described in FIG. 1. Device 100 described herein may be implemented, for example, as an integrated circuit (e.g., an Application-Specific Integrated Circuit (ASIC) or using a field-programmable gate array (FPGA), in software (e.g., loading program instructions to a processor from a computer-readable storage medium and executing the instructions by the processor), or by a combination of hardware and software.

In some embodiments, device 1000 comprises an interconnect or bus 1002 (or other communication means) for transmission of data. Device 1000 can include a processing means such as one or more processors 1004 coupled with bus 1002 for processing information. Processors 1004 can comprise one or more physical processors and/or one or more logical processors. While bus 1002 is illustrated as a single interconnect for simplicity, it is understood that bus 1002 can represent multiple different interconnects or buses. Bus 1002 shown in FIG. 10 is an abstraction that represents any one or more separate physical buses, point to point connections, or both connected by appropriate bridges, adapters, controllers and/or the like.

In some embodiments, device 1000 further comprises a random access memory (RAM) or other dynamic storage device depicted as main memory 1012 for storing information and instructions to be executed by processors 1004. Main memory 1012 can include an active storage of applications including a browser application for using in network browsing activities by a user of device 1000. Main memory 1012 can further include certain registers or other special purpose memory.

Device 1000 can also comprise a read only memory (ROM) 1016 or other static storage device for storing static information and instructions for processors 1004. Device 1000 can further include one or more non-volatile memory elements 1018 for the storage of certain elements, including, for example, flash memory, a hard disk, solid-state drive. Device 1000 can comprise transceiver module 1020 that is coupled to bus 1102. Transceiver module 1020 can further comprise a transmitter module and a receiver module. Transceiver module 1020 comprises one or more ports 1022 to connect to other devices (not shown). For example, device 1000 can function as a device 110 and/or device 170 depicted in FIG. 1.

Device 1000 can also comprise circuit logic 1040 coupled to bus 1002 and configured to receive information from a second device (not shown) coupled through ports 1022. The information received by circuit logic 1040 can include an input stream of data to be transcoded or transcoded stream of data to be decoded. Device 1000 can further comprise transcoder module 1050 for transcoding data. For example, input stream received through ports 1022 and transceiver module 1020 can be transcoded by transcoder module 1050. In some embodiments, transcoder module can also perform decoding of data that has already been transcoded before received by device 1000.

Device 1000 can also comprise output display 1026 and coupled via bus 1102. In some embodiments, display 1026 can include a liquid crystal display (LCD) or any other display technology, for displaying information or content to a user, including three-dimensional (3D) displays. Alternatively, display 1026 can include a touch screen that can also be part of input device 1024. In some environments, display 1026 can include an audio device, such as a speaker for providing audio information. Device 1000 can also comprise power device 1030 that can comprise a power supply, a battery, a solar cell, a fuel cell, or other device for providing or generating power. Any power provided by power device 1030 can be distributed as required to elements of device 1000.

While this disclosure described an input stream of data to be transcoded as USB3 data, it will be understood that the input stream described in this disclosure can be in accordance with other standards or other applications. While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure as defined in the appended claims.

What is claimed is:

1. A method for transcoding data, the method comprising:
   receiving, at a device, an input stream of data partitioned into a sequence of blocks having a fixed length number of symbols, the sequence of blocks including an input block comprising at least one data symbol, at least one general control symbol, and a delimiter control symbol;
   generating a synchronization block of an output block indicating whether the input block comprises at least one of the at least one general control symbol and the delimiter control symbol;
   generating an indicator output symbol of a control/data block of the output block, the indicator output symbol comprising at least a first indicator comprising a first value if the input block ends with a general control symbol or the delimiter control symbol and the first indicator comprising a second value if the input symbol ends with a data symbol, a second indicator indicating a position of the delimiter control symbol in the input block, and a third indicator indicating one or more positions of data symbols appearing before the delimiter control symbol in the input block;
   generating one or more control/data output symbols of the control/data block of the output block, the one or more control/data symbols including the at least one data symbol of the input block and the at least one general control symbol of the input block; and
   outputting the output block.

2. The method of claim 1, wherein the received input stream comprises groups of at least four consecutive data symbols and groups of at least four consecutive control symbols, wherein each of the groups of at least four consecutive control symbols includes at least three general control symbols and ends with a delimiter control symbol, wherein the sequence of blocks includes at least one block having a group of at least four consecutive data symbols beginning at each available symbol position.

3. The method of claim 1,
   wherein the indicator output symbol further comprises a fourth indicator indicating whether remaining symbols positioned after the fourth indicator in the at least one output block comprise at least one control symbol.

4. The method of claim 3, further comprising:
   responsive to the at least one input block ending with a control symbol, compressing a last control symbol of the input block, and combining the first indicator, the fourth indicator, and the compressed last control symbol into a compressed control symbol of the control/data block of the output block.

5. The method of claim 3, wherein determining the fourth indicator comprises:
   setting a least significant bit of the compressed control symbol of the one output block to represent the fourth indicator.

6. The method of claim 1, wherein determining the first indicator comprises:
   setting a most significant bit of the indicator output symbol of the output block to represent the first indicator.

7. An apparatus for transcoding data comprising:
   a transceiver configured for receiving an input stream of data partitioned into a sequence of blocks having a fixed length number of symbols, the sequence of blocks including, an input block comprising at least one data symbol, at least one general control symbol, and a delimiter control symbol;
   a transcoder configured for generating a synchronization block of an output block indicating whether the input block comprises at least one of the at least one general control symbol and the delimiter control symbol, generating an indicator output symbol of a control/data block of the output block, the indicator output symbol comprising at least a first indicator comprising a first value if the input block ends with a general control symbol or the delimiter control symbol and the first indicator comprising a second value if the input symbol ends with a data symbol, generating a second indicator indicating a position of the delimiter control symbol in the input block, generating a third indicator indicating one or more positions of data symbols appearing before the delimiter control symbol in the input block, generating one or more control/data output symbols of the control/data block of the output block, the one or more control/data symbols including the at least one data symbol of the input block and the at least one general control symbol of the input block, and outputting the output block.

8. The apparatus of claim 7, wherein the transceiver is configured to receive the input stream comprising groups of at least four consecutive data symbols and groups of at least four consecutive control symbols, wherein each of the groups of the at least four consecutive control symbols includes at least three general control symbols and ends with a delimiter control symbol, wherein the sequence of blocks includes at least one block having a group of at least four consecutive data symbols beginning at each available symbol position.

9. The apparatus of claim 7, wherein the transcoder is configured to
   generate a fourth indicator of the indicator output symbol the fourth indicator indicating whether remaining symbols positioned after the second indicator in the at least one output block comprise at least one control symbol.

10. The apparatus of claim 9, wherein
    responsive to the at least one input block ending with a control symbol, the transcoder is further configured to compress a last control symbol of the input block and combine the first indicator, the fourth indicator, and the compressed last control symbol into a compressed control symbol of the control/data block of the output block.

11. The apparatus of claim 7, wherein the transcoder is configured to determine the first indicator at least in part by setting a most significant bit of the indicator output symbol of the output block to represent the first indicator.

12. The apparatus of claim 9, wherein the transcoder is configured to determine the fourth indicator at least in party by setting a least significant bit of the indicator output symbol of the output block to represent the indicator.

13. A non-transitory computer-readable medium having embedded thereon a program, the program being executable by a processor for performing a method for transcoding data, the method comprising:
    receiving, at a device, an input stream of data partitioned into a sequence of blocks having a fixed length number of symbols, the sequence of blocks including an input block comprising at least one data symbol, at least one general control symbol, and a delimiter control symbol;

generating a synchronization block of an output block indicating whether the input block comprises at least one of the at least one general control symbol and the delimiter control symbol;

generating indicator output symbol of a control/data block of the output block, the indicator output symbol comprising at least a first indicator comprising a first value if the input block ends with a general control symbol or the delimiter control symbol and the first indicator comprising a second value if the input symbol ends with a data symbol, a second indicator indicating a position of the delimiter control symbol in the input block, and a third indicator indicating one or more positions of data symbols appearing before the delimiter control symbol in the input block;

generating one or more control/data output symbols of the control/data block of the output block, the one or more control/data symbols including the at least one data symbol of the input block and the at least one general control symbol of the input block; and outputting the output block.

14. The computer-readable medium of claim 13, wherein the received input stream comprises groups of at least four consecutive data symbols and groups of at least four consecutive control symbols, wherein each of the groups of at least four consecutive control symbols includes at least three general control symbols and ends with a delimiter control symbol, wherein the sequence of blocks includes at least one block having a group of at least four consecutive data symbols beginning at each available symbol position.

15. The computer-readable medium of claim 13,
wherein the indicator output symbol further comprises a fourth indicator indicating whether remaining symbols positioned after the fourth indicator in the at least one output block comprise at least one control symbol.

* * * * *